US009221998B2

(12) United States Patent
Kaune et al.

(10) Patent No.: US 9,221,998 B2
(45) Date of Patent: Dec. 29, 2015

(54) EROSION-RESISTANT COATING COMPOSITIONS

(75) Inventors: Martin Kaune, Bremen (DE); Bianca Holters, Rastede (DE); Dieter Hohnholz, Gross Ippener (DE)

(73) Assignee: BASF Coatings GmbH, Munster (DE)

( * ) Notice: Subject to any disclaimer, the term of this patent is extended or adjusted under 35 U.S.C. 154(b) by 182 days.

(21) Appl. No.: 13/821,388

(22) PCT Filed: Sep. 8, 2011

(86) PCT No.: PCT/EP2011/065545
§ 371 (c)(1),
(2), (4) Date: May 1, 2013

(87) PCT Pub. No.: WO2012/032113
PCT Pub. Date: Mar. 15, 2012

(65) Prior Publication Data
US 2013/0210997 A1     Aug. 15, 2013

(30) Foreign Application Priority Data
Sep. 10, 2010   (DE) .................. 10 2010 044 935

(51) Int. Cl.
| B05D 1/36 | (2006.01) |
| B05D 3/02 | (2006.01) |
| B05D 7/00 | (2006.01) |
| B32B 27/00 | (2006.01) |
| B32B 27/40 | (2006.01) |
| C08G 18/08 | (2006.01) |
| C08G 18/28 | (2006.01) |
| C08L 75/00 | (2006.01) |
| C09D 175/08 | (2006.01) |
| C09D 175/06 | (2006.01) |
| C08L 75/06 | (2006.01) |
| C08L 75/04 | (2006.01) |
| C09D 5/00 | (2006.01) |
| C08L 75/08 | (2006.01) |
| C09D 5/08 | (2006.01) |
| C08G 18/12 | (2006.01) |
| C08G 18/40 | (2006.01) |
| C08G 18/42 | (2006.01) |
| C08G 18/72 | (2006.01) |
| C08G 18/79 | (2006.01) |
| C09D 175/04 | (2006.01) |

(52) U.S. Cl.
CPC .............. *C09D 175/08* (2013.01); *C08G 18/12* (2013.01); *C08G 18/4018* (2013.01); *C08G 18/4277* (2013.01); *C08G 18/725* (2013.01); *C08G 18/79* (2013.01); *C08L 75/04* (2013.01); *C08L 75/06* (2013.01); *C08L 75/08* (2013.01); *C09D 5/00* (2013.01); *C09D 5/08* (2013.01); *C09D 175/04* (2013.01); *C09D 175/06* (2013.01); *C08L 2203/00* (2013.01); *C08L 2203/18* (2013.01); *C08L 2312/00* (2013.01)

(58) Field of Classification Search
CPC ....... C08L 67/00; C08L 67/025; C08L 67/04; C08L 71/00; C08L 71/02; C08L 75/00; C08L 75/04; C08L 75/06; C08L 75/08; C08L 2203/00; C08L 2203/18; C08L 2312/00; C09D 175/08; C09D 5/00; C09D 5/08; C09D 175/04; C09D 175/06; E04B 1/62; E04B 1/64; E04B 1/66; E04F 13/00; E04F 13/02; F16L 57/00; F16L 58/00; F16L 58/02; F16L 58/04; F16L 58/10; F16L 58/1009; F16L 58/1054; B62D 21/00; B62D 23/00; B62D 25/00; B62D 29/00; B62D 31/00; B63B 59/00; B64C 1/00; B64C 11/16; B64C 27/46; B64C 27/473; B64C 2027/4733; B64C 2027/4736
USPC ................ 427/407.1, 372.2, 385.5, 408, 409, 427/412.2; 524/589, 590; 428/423.1, 425.8; 52/515, 517, 741.4; 114/343; 138/146; 180/313; 244/7 A, 39, 200; 416/241 A
See application file for complete search history.

(56) References Cited

U.S. PATENT DOCUMENTS

2003/0203771 A1*  10/2003  Rosenberg et al. ........... 473/371
2010/0047462 A1    2/2010  Jansing et al.

FOREIGN PATENT DOCUMENTS

| DE | 102006053776 A1 | 5/2008 |
| GB | 2287469 A | 9/1995 |
| WO | WO9844015 A1 | 10/1998 |

(Continued)

OTHER PUBLICATIONS

Beuschel et al., "Larkharze, Chemie, Eignschaften und Anwendungen", Carl Hanser Verlag Munich and Vienna 1996, ISBN 3-446-17475-3, pp. 204-210.

(Continued)

*Primary Examiner* — Patrick Niland
(74) *Attorney, Agent, or Firm* — Servilla Whitney LLC

(57) ABSTRACT

The invention relates to a composition which comprises at least one polyol component having a hydroxyl group content of 9% to 15% by weight relative to the total weight of the polyol component, and at least one isocyanate component having a free isocyanate group content of 10% to 15% by weight relative to the total weight of the isocyanate component. The polyol component comprises at least one polyol which is selected from the group of the polyether polyols, polyester polyols, and polyether polyester polyols. The isocyanate component comprises at least one di- or polyisocyanate-terminated polylactone prepolymer. The composition can be used as erosion-resistant coating material.

5 Claims, No Drawings

(56) References Cited

FOREIGN PATENT DOCUMENTS

| WO | WO2006055038 A1 | 5/2006 |
| WO | WO2008031879 A1 | 3/2008 |

OTHER PUBLICATIONS

English Translation of Beuschel et al., "Larkharze, Chemie, Eignschaften und Anwendungen", Carl Hanser Verlag Munich and Vienna 1996, ISBN 3-446-17475-3, pp. 204-210.

Beuschel et al., "Larkharze, Chemie, Eignschaften und Anwendungen", Carl Hanser Verlag Munich and Vienna 1996, ISBN 3-446-17475-3, pp. 377-383.

English Translation of Beuschel et al., "Larkharze, Chemie, Eignschaften und Anwendungen", Carl Hanser Verlag Munich and Vienna 1996, ISBN 3-446-17475-3, pp. 377-383.

English Translation of International Preliminary Report on Patentability for International Application No. PCT/EP2011/065545 issued Mar. 12, 2013, 5 pages.

English Translation of International Search Report for International Application No. PCT/EP2011/065545 mailed Nov. 8, 2011, 2 pages.

Written Opinion for International Application No. PCT/EP2011/065545 mailed Nov. 8, 2011, 6 pages.

\* cited by examiner

EROSION-RESISTANT COATING COMPOSITIONS

CROSS REFERENCE TO RELATED APPLICATIONS

This application is a National Phase Application of Patent Application PCT/EP2011/065545 filed on 8 Sep. 2011, which claimed priority to DE 10 2010 044 935.0, filed 10 Sep. 2010, of which both application are incorporated by reference herein in their entirety.

FIELD OF THE INVENTION

The present invention relates to compositions, to a process for preparing them, to their use as coating materials, to multicoat coating systems comprising these compositions, to processes for producing the multicoat coating systems, and to their use. The invention further relates to substrates coated with the composition or with the multicoat coating system.

BACKGROUND OF THE INVETION

Erosion-resistant surfaces are increasingly required for specific functions of corresponding products. Examples here include surfaces which in terms of the ambient conditions are exposed to high speeds in conjunction with exposure to erosive substances, such as solids or liquids. Erosive exposure is experienced in principle by objects which, firstly, themselves are moved, such as rotor blades (of wind energy systems or helicopters or boat screws), air and land vehicles (such as aircraft, rail vehicles, automobiles), and boats, for example, and, second, by objects around which or through which there is movement, such as built structures (such as architectural facing elements, power masts or wind energy towers or broadcasting towers) or pipelines, for example.

Fundamentally, erosion can be brought about by liquid or solid substances which are present themselves or dispersely or in solution in another gaseous or liquid medium (e.g., air or water) and are moved by that medium (e.g., airborne sand, rain). When these substances impinge on articles, they exert an erosive force on them. Examples of this are the erosion due to rain or airborne sand on rotor blades or in the region of the slats on aircraft.

In general terms the possibility exists of controlling wear protection, such as the erosion resistance of coatings, through the fundamentally different measures below.

For example, it is possible to increase the film thickness of the coating. In many applications, such as in aircraft construction or rotor blade construction of wind energy systems, however, this is not desirable, for reasons of weight.

Furthermore, resins with aromatic resin constituents, such as epoxy resins, can be used in the coating materials. On account of the aromatic moieties, the resultant coatings offer high wear resistance, but a significantly restricted UV stability.

It is possible, furthermore, to use coating materials comprising resins with which, induced by light or by temperature, high crosslinking densities can be achieved. For example, UV resins (via free-radical or ionic polymerization) or certain highly reactive polyaddition resins can be used. With these classes of binder it is likewise possible to enhance the wear resistance, but there are limiting factors in the case of use on large components such as rotor blades or aircraft components. In the case of formulations comprising UV resins, for example, the selection of pigments is limited, since these pigments may have absorption maxima at curing wavelengths, and the film thicknesses are limited in dependence on the levels of pigmentation. Moreover, technical challenges arise in terms of oxygen inhibition of the UV initiators. In the case where temperature-induced coating materials are used (e.g., polyurethane-based baking varnishes), a limitation exists particularly with regard to the baking temperatures in relation to plant dimensions for large components.

The coatings presently used in rotor blade or aircraft construction do not offer erosion resistance for future challenges in—for example—rotor blade construction of wind energy systems, particularly in relation to high-wind locations (offshore) or in aircraft construction (weight reduction with equal or better performance). The task, therefore, is to meet the demand for coatings which offer significant improvement in erosion resistance and therefore minimize expensive maintenance and repair intervals.

International patent application WO 2006/055038A1 to Hontek Corporation discloses erosion-resistant polyurethane coatings which are prepared from isocyanate prepolymers in conjunction with polyaspartates. The coatings do not adequately meet the requirements relating to the duration of erosion resistance. Moreover, if humidity is too low, these materials may become problematic to cure.

Means of erosion resistance include not only erosion-resistant coatings but also films. These are, for example, polyurethane elastomer films with acrylate adhesives. The films, however, are difficult to process, especially in the case of relatively large and/or multiply curved components such as aircraft or rotor blade components of wind energy systems. Components of these kinds cannot be provided uniformly with a film. In addition, the adhesive of the films often lacks sufficient durability as compared with coatings. This may result in a decrease in erosion stability.

The problem addressed by the present invention, therefore, was that of eliminating the above-described disadvantages of the prior art. The intention was to provide compositions which, as erosion-resistant coatings, feature significantly improved erosion resistance compared with erosion-resistant coatings of the prior art.

Besides the sought-after erosion resistance of the coating materials for the applications already described above, the compositions ought to offer effective resistance to the general effects of weathering (for example, UV radiation, moisture, etc.). The coatings ought further to be resistant to operating fluids such as transmission oils. The coating materials ought also to be easy to prepare and easy to process even with large components such as rotor blades of wind energy systems or aircraft.

SUMMARY OF THE INVENTION

Compositions have been found, surprisingly, which do not have the disadvantages of the prior art. In particular, compositions have been found which exhibit high erosion stability in coatings. Accordingly, the compositions found comprise a. at least one polyol component having a hydroxyl group content of 9% to 15% by weight, based on the total weight of the polyol component, the polyol component comprising at least one polyol selected from the group consisting of polyether polyols, polyester polyols, and polyether polyester polyols, and b. at least one isocyanate component having an isocyanate group content of 10% to 15% by weight, based on the total weight of the isocyanate component, the isocyanate component comprising at least one di- or polyisocyanate-terminated polylactone prepolymer.

The OH groups of the polyol component and the isocyanate groups of the isocyanate component are used preferably in an equivalents ratio of 1:0.9 to 1:1.5. The equivalents ratio is preferably 1:0.95 to 1:1.3. It is particularly preferred for the OH groups of the polyol component not to be in excess in relation to the isocyanate groups of the isocyanate component. Especially preferred is a ratio from 1:1 to 1:1.2, and more particularly it is 1:1.

Further preferred embodiments of this invention are described by the dependent claims.

DETAILED DESCRIPTION OF AN EMODIMENT OF THE INVENTION

Present in the composition there may be further binders, pigments, solvents, molecular sieves, fillers, dyes, catalysts, and also additives and auxiliaries. These are different than the constituents of the polyol component and isocyanate component. They may be mixed both with the polyol component and with the isocyanate component, but preferably with the polyol component.

Polyol Component

The polyol component comprises at least one polyol selected from the group consisting of polyether polyols, polyester polyols, and polyether polyester polyols. Polyether polyester polyols are polyols which comprise both polyester structures and polyether structures. The polyol is preferably selected from polyether polyols and polyester polyols. It is particularly preferred to use a mixture of polyethers and polyesters.

Suitable polyether polyols are, for example, polyoxyethylenes or polyoxypropylenes.

The polyether polyols, polyester polyols, and polyether polyester polyols may comprise dimeric fatty acids. These polyols can be prepared, for example, by esterification of dimeric fatty acids with polyhydric alcohols and subsequent polymerization. Starting compounds used in this condensation reaction may be amines, such as 3,5-diethyl-2,4-toluenediamine or 3,5-diethyl-2,6-toluenediamine. At a desired OH content, the reaction is terminated. Moreover, the polyether polyols, polyester polyols and polyether polyester polyols comprising dimeric fatty acids may be obtained by epoxidation of dimeric fatty acids, subsequent reaction with polyhydric alcohols and/or polybasic carboxylic acids, and then polymerization (Stoye/Freitag: Lackharze, Carl Eanser Verlag Munich and Vienna 1996, ISBN 3-446-17475-3, pages 204-210 and pages 377-383).

Suitable dimeric fatty acids come, for example, from natural oils such as soybean oil, rapeseed oil, castor oil, sunflower oil, and palm oil.

The polyol component may further comprise other polyols such as polylactones, polyacrylates and/or polyepoxides, for example.

The polyol component preferably comprises at least 50% by weight, based on the total weight of the polyol component, of a polyol which is selected from the group consisting of polyether polyols, polyester polyols, and polyether polyester polyols. 80% by weight is preferred, more preferably 90% by weight, and very preferably 100% by weight.

The polyols of the polyol component may be linear or branched. Preferably the polyols are branched. Moreover, the polyols of the polyol component may be saturated or unsaturated, with saturated polyols being preferred.

The fraction of the polyol component, based on the total weight of the composition, is preferably 5% to 30% by weight and more preferably 15% to 25% by weight. The sum of all of the constituents of the composition of the invention is 100% by weight.

The polyol component preferably comprises OH groups with a fraction of 10% to 12% by weight, relative to the total weight of the polyol component.

The polyol component preferably has an acid number of 0 to 3 mg KOH/g, based on the solids. The acid number is determined in accordance with ISO 660.

The hydroxyl content of the polyol component is preferably 9% to 13% by weight, based on the total weight of the polyol component. The hydroxyl content can be determined via the hydroxyl number. This hydroxyl number is determined in accordance with DIN 53240.

The polyol component preferably has a solids content of 95% to 100% by weight. The solids content of the composition and of its constituents is determined in accordance with DIN ISO 3251 with an initial mass of 1.0 g, a test duration of 60 minutes, and a temperature of 125° C.

The individual polyols of the polyol component may have a weight-average molecular weight of 160 to 4000 g/mol, preferably 160 to 2000 g/mol.

The polyol component preferably has a weight-average molecular weight of 160 to 800 g/mol. A weight-average molecular weight of 180 to 600 g/mol is preferred, 200 to 500 g/mol particularly preferred.

The molecular weight of all of the compounds described is determined—unless otherwise indicated—by means of GPC analysis with THF (+0.1% by weight acetic acid, based on the THF weight) as eluent (1 ml/min) on a styrene-divinylbenzene column combination. Calibration takes place with polystyrene standards.

Isocyanate Component

The isocyanate component comprises at least one di- or polyisocyanate-terminated polylactone prepolymer. This means that the prepolymer is terminated with at least one diisocyanate or with at least one polyisocyanate. The prepolymer is preferably diisocyanate-terminated. The terminal NCO groups may be blocked entirely, partly or not at all. Preferably they are not blocked.

Blocked isocyanate compounds may be obtained from isocyanates by reaction with a blocking agent. Blocking agents contemplated for isocyanates include all typically used blocking agents such as the corresponding alcohols, amines, ketones, pyrazoles, and others, preferably blocking agents having a deblocking temperature of below 60° C.

The prepolymer has a weight-average molecular weight of 500 to 4000 g/mol, preferably of 1000 to 3000 g/mol, and more preferably of 1800 to 2200 g/mol. It can be prepared from lactones and at least one diol or polyol as starter molecule. Diols are preferred, especially diols with terminal OH groups. Suitable diols and polyols are neopentylglycol, ethylene glycol, and trimethylolpropane. Suitable lactones are oxiran-2-one, β-propiolactone, γ-butyrolactone, γ-valerolactone, ε-caprolactone or methyl-ε-caprolactone, preferably γ-butyrolactone and ε-caprolactone, more preferably ε-caprolactone. Accordingly, polybutyrolactone prepolymers and polycaprolactone prepolymers are preferred polylactone prepolymers. Especially preferred are polycaprolactone prepolymers.

The prepolymer may be linear or branched. Preferably the prepolymer is linear. Furthermore, the prepolymer may be saturated or unsaturated, with saturated prepolymers being preferred.

The prepolymer is preferably liquid at 20° C. and 1013 hPa.

The fraction of di- or polyisocyanate-terminated polylactone prepolymer is preferably at least 50% by weight, based on the total weight of the isocyanate component. Preferably the fraction is 50% to 99% by weight, more preferably 70% to 90% by weight.

The polylactone prepolymer preferably has a weight-average molecular weight of 500 to 4000 g/mol. A weight-average molecular weight of 1000 to 3000 g/mol is preferred, more preferably 1250 to 2500 g/mol.

The fraction of NCO groups in the prepolymer is preferably 6% to 12% by weight, based on the total weight of the prepolymer. Preferably the fraction is 7% to 10% by weight, more preferably 8% to 9% by weight.

The isocyanate component may further comprise at least one other isocyanate compound which is different from the prepolymer. The isocyanate groups of these compounds may be blocked entirely, partly or not at all. Preferably they are not blocked.

Suitable further isocyanate compounds include the aromatic and aliphatic isocyanate compounds that are typically used within the coatings industry. Preference is given to di- or polyisocyanate compounds. Aliphatic di- or polyisocyanates are preferred. Aliphatic diisocyanates are particularly preferred.

The fraction of NCO groups of the further isocyanate compounds is preferably 15% to 30% by weight, based on the total weight of the further isocyanate compound. Preferably the fraction is 20% to 25% by weight.

Possible aromatic isocyanate compounds include, for example, 2,4-tolylene diisocyanate and 2,6-tolylene diisocyanate (TDI), 4,4-diisocyanatodiphenylmethane (MDI), p-phenylene diisocyanate (PPDI) or oligomers thereof, the oligomers being preferred.

Examples of suitable aliphatic diisocyanates include 1,6-hexamethylene diisocyanate (EDI), 1,3-cyclohexyl diisocyanate, 1,4-cyclohexyl diisocyanate (CEDI), diphenylmethane diisocyanates (H(12)MDI), 2,2,4- and/or 2,4,4-trimethyl-1,6-hexamethylene diisocyanate, dodecamethylene diisocyanate, 1,4-diisocyanato-cyclohexane, 1-isocyanato-3,5,5-trimethyl-3-isocyanato-methylcyclohexane (IPDI) or oligomers thereof, the oligomers being preferred.

Oligomers comprise isocyanurates and/or uretdiones.

Furthermore, isocyanate polymers may be used as other isocyanate compounds. They may be obtained from the reaction of the aforementioned aromatic and aliphatic isocyanate compounds or oligomers thereof with resins comprising OH, NH or SH groups. The isocyanate polymers preferably contain less than 0.1% by weight of free OH, NH or SH groups, based on the total weight of the isocyanate polymers. With particular preference the isocyanate polymer contains no free OH, NH or SH groups.

The further isocyanate compound is preferably present with a fraction of 1% to 50% by weight, more preferably 10% to 30% by weight, based on the total weight of the isocyanate component.

The isocyanate component preferably comprises isocyanate groups with a content of 10% to 13% by weight, relative to the total weight of the isocyanate component.

The fraction of the isocyanate component in the composition of the invention is preferably up to 70% by weight, based on the total weight of the composition. 40% to 63% by weight is preferred, and 47% to 60% by weight particularly preferred. A fraction of 47% to 53% by weight is especially preferred.

An especially preferred composition of the present invention comprises as polyol component a mixture of polyether and polyesters, the fraction of polyol component being 15% to 25% by weight, based on the total weight of the composition. The polyol component comprises OH groups with a fraction of 10% to 12% by weight relative to the total weight of the polyol component. Used as isocyanate component in this especially preferred composition is a mixture of a diisocyanate-terminated polycaprolactone prepolymer and a further isocyanate compound, the fraction of the diisocyanate-terminated polycaprolactone prepolymer being 70% to 90% by weight, based on the total weight of the isocyanate component, and the fraction of the isocyanate component being 47% to 53% by weight, based on the total weight of the composition. The isocyanate component contains isocyanate groups with a fraction of 10% to 13% by weight relative to the total weight of the isocyanate component.

Further Binders

The composition of the invention may comprise further binders with functional groups and also at least one crosslinking agent with a functionality complementary to the functional groups of binder. Examples of such complementary functionalities are in particular (carboxyl/epoxy), (amine or thiol/alkoxylated amino groups or transesterifiable groups), ((meth)acryloyl/-CH-acidic or amine or thiol), (carbamate/alkoxylated amino groups), and ((meth)acryloyl/(meth)acryloyl).

The binders may further have ethylenically unsaturated double bonds. These may be present, for example, in acrylate polymers, styrene polymers or polyurethane polymers.

Furthermore, polymers containing alkoxysilane groups may be present as further binders. Preference is given to polymers containing epoxy- or amino-modified alkoxy-silane groups. With particular preference the polymers contain di- and/or trialkoxysilane groups.

Preferred further binders contain ethylenically unsaturated double bonds.

It is preferred for crosslinking agents such as amino resins or tris(alkoxycarbonylamino)-1,3,5-triazines (TACT) to be absent from the composition.

Moreover, binders may be present in the composition of the invention with a fraction of 5% to 30% by weight, based on the total weight of the composition.

Pigments

The composition of the invention may comprise pigments. The composition preferably contains 2% to 20% by weight, based on the total weight of the composition, of at least one pigment. Preferred compositions are those containing 5% to 10% by weight of pigments.

Pigments are colorants in powder or platelet form which unlike dyes are insoluble in the surrounding medium (cf. Römpp Lacke and Druckfarben, Georg Thieme Verlag Stuttgart/New York 1998, page 451, entry heading "Pigments").

The pigment is preferably selected from the group consisting of organic and inorganic, color, effect, color and effect, magnetically shielding, electrically conductive, corrosion-inhibiting, fluorescent, and phosphorescent pigments. Preference is given to using the color and/or effect pigments.

Solvents

As solvents, the composition may comprise water or organic solvents. Preferably not more than 5% by weight, more preferably not more than 2% by weight, of solvent is present, based on the total weight of the composition. Particularly preferred are compositions which are free of solvents.

Molecular Sieve

The composition of the invention may comprise a molecular sieve or two or more molecular sieves. Molecular sieve is the term for natural or synthetic zeolites. They have a relatively high internal surface area (around 600 to 700 $m^2/g$) and uniform pore diameters. As a result, their adsorption capacity is relatively high. The composition preferably contains 1% to 10% by weight, based on the total weight of the composition, of at least one molecular sieve.

Suitable molecular sieves have a pore size of 2 to 10, preferably 3 to 4, angstroms. Use may be made, for example, of high-porosity aluminum silicates having a pore size of 3 angstroms.

Fillers

The composition of the invention may comprise organic and inorganic fillers. Suitable fillers are, for example, talc, calcium carbonates, barium sulfates, and silicon dioxides. Preferred fillers are calcium carbonates, barium sulfates, and silicon dioxides.

The composition preferably contains 20% to 50% by weight, based on the total weight of the composition, of at least one filler.

Dyes

The composition of the invention may comprise dyes. Dyes are organic, black or chromatic substances which are soluble in the surrounding medium (cf. Römpp Lacke and Druckfarben, page 221, entry heading "Colorants"). The composition preferably contains 0.1% to 1.0% by weight, based on the total weight of the composition, of at least one dye.

Catalysts

The composition of the invention may comprise catalysts for the reaction of hydroxyl with isocyanate groups. The composition preferably contains 0.05% to 2% by weight, based on the total weight of the composition, of at least one catalyst. The composition of the invention contains preferably 0.1% to 1% by weight, based in each case on the total weight of the composition, of at least one catalyst.

Suitable catalysts are metal catalysts such as, for example, tin, molybdenum, zirconium or zinc catalysts, and also aminic catalysts such as, for example, 2-(2-dimethylamino-ethoxy)ethanol.

Auxiliaries and Additives

The composition of the invention may comprise auxiliaries and additives which are different from the substances identified above. The composition preferably contains 2% to 5% by weight, based on the total weight of the composition, of at least one auxiliary or additive.

Suitable auxiliaries or additives are the known auxiliaries and additives used typically in the coatings industry.

Examples of suitable auxiliaries and additives are typical auxiliaries and additives such as, for example, antioxidants, deaerating agents, wetting agents, dispersants, emulsifiers, rheological assistants such as flow control agents, thickeners, sag control agents, and thixotropic agents, waxes and waxlike compounds, slip additives, reactive diluents, free-flow aids, siccatives, biocides, substrate wetting enhancer additives, surface smoothness enhanced additives, matting agents, free-radical scavengers, light stabilizers, preferably UV absorbers with an absorption maximum below 370 nm and/or sterically hindered amines (HALS), corrosion inhibitors, flame retardants or polymerization inhibitors, as described in detail in the book "Lackadditive" by Johan Bieleman, Wiley-VCE, Weinheim, New York, 1998. Preferred auxiliaries and additives are rheological assistants, deaerating agents, wetting agents, dispersants, UV absorbers, and free-radical scavengers. Particularly preferred auxiliaries and additives are UV absorbers, wetting agents, and rheological assistants.

By adding the auxiliaries and additives it is possible to provide the erosion-resistant coating of the invention with surface effects, such as reduction of contamination and infestation, aerodynamic improvement (streamlining surfaces such as riblets, for example) or easy-to-clean properties.

Further Subjects of the Invention

The composition of the invention is prepared preferably by the process of the invention for preparing the composition of the invention.

Accordingly, a process for preparing the composition of the invention is a further subject of the present invention. The composition in this case may be prepared by mixing and optionally homogenizing at least one polyol component with at least one isocyanate component. They are preferably mixed with one another, and optionally homogenized, in the proportions already indicated.

A further subject of the present invention is the use of the composition as coating material. The composition is used preferably as erosion-resistant coating material. The coating material is used preferably to produce an erosion-resistant coat in multicoat coating systems.

The composition of the invention can be used as Original Equipment Manufacturer (OEM) coating material or as refinish coating material.

A further subject of the invention is a multicoat coating system comprising at least one coating of the composition of the invention. The multicoat coating system preferably further comprises at least one primer coat.

Within the multicoat coating system of the invention, the coating of the composition of the invention may itself function as topcoat (outmost coating).

Furthermore, the coating of the composition of the invention may be topcoated with at least one further coating material (identified as topcoat material below), with the coating of the further coating material functioning as topcoat.

Suitable topcoat materials are all solvent borne or aqueous pigmented coating materials that are typically employed. The topcoat materials used may be curable thermally and/or by means of radiation, more particularly by means of IR radiation.

The topcoat materials typically comprise at least one binder having functional groups and also at least one crosslinker having a functionality complementary to the functional groups of binder. Examples of such complementary functionalities are in particular (carboxyl/epoxy), (amine or thiol or hydroxyl/blocked or free isocyanate or alkoxylated amino groups or transesterifiable groups), ((meth)acryloyl/CE-acidic or amine or hydroxyl or thiol), (carbamate/alkoxylated amino groups), and ((meth)acryloyl/(meth)acryloyl).

Use is made in particular of topcoat materials based on polyurethane resins and/or polyacrylate resins and/or polyester resins, preferably with hydroxyl, amino, carbamate, carboxyl, (meth)acryloyl and/or thiol groups, in combination with the corresponding cross-linkers, especially in combination with isocyanates.

Besides the binder and the crosslinker, the topcoat materials comprise typical auxiliaries and additives, such as, for example, crosslinking catalysts, defoamers, adhesion promoters, substrate wetting enhancer additives, rheological agents, waxes, flow control agents, light stabilizers, preferably the above-described UV absorbers having an absorption maximum below 370 nm and/or HALS, corrosion inhibitors, biocides, flame retardants or polymerization inhibitors, as described in the book "Lackadditive" by Johan Bieleman, Wiley-VCE, Weinheim, New York, 1998, in detail. Suitable pigmented coating materials are described, for example, in German patent application DE-A-2006053776.

A further subject of the present invention is a process for producing the multicoating system of the invention. In this process, at least one composition of the invention is applied to a substrate. At least one further coating of a topcoat material may be applied to the coating of the composition of the invention. The topcoat material may be applied wet-on-wet. The coatings of the composition of the invention and of the topcoat material may be jointly cured.

The topcoat material and also the composition of the invention may be applied by the customary techniques such as spraying (e.g., airless, airmix, compressed-air, hot-spray method or induction mixing), roller coating, rolling, spreading, or using a cartridge. The topcoat material and also the composition of the invention are preferably sprayed, rolled or applied via a cartridge.

The coating of the composition of the invention is applied preferably in a dry film thickness of 100 to 1000 µm. A dry film thickness of 200 to 800 µm is preferred, more preferably 300 to 600 µm.

The coatings of the topcoat material may each have a dry film thickness of 80 to 300 µm, preferably of 80 to 150 µm.

The coating of the composition of the invention and also, where appropriate, the coating of the topcoat material may be cured thermally and/or actinically.

Curing takes place preferably thermally, preferably at a temperature of up to 60° C. A temperature range from 15 to 60° C. is particularly preferred, especially from 18 to 50° C.

Thermal curing takes place preferably for a time of 30 to 90 minutes at 40° C. to 60° C., or 4 to 6 hours at 15° C. to 25° C. Complete through-curing is achieved typically after around seven days at 20° C. The skilled worker refers then to the "development of the ultimate properties".

For the drying and/or conditioning of the wet films it is preferred to use thermal and/or convective methods, with typical and known apparatus such as tunnel ovens, radiant IR and NIR heaters, fans, and blowing tunnels being used. These types of apparatus may also be combined with one another.

The multicoat coating systems of the invention may be applied to any desired substrates. The coat of the composition of the invention functions in the systems as an erosion-resistant coat. The substrates may be made of any of a very wide variety of different materials and combinations of materials. They consist preferably of metals such as steel or aluminum, plastics, which may be glass fiber reinforced (GRP), aramide fiber reinforced (ARP), carbon fiber reinforced (CRP) or, for example, reinforced with natural hemp or sisal fiber, and/or glass, more preferably of metal and/or plastic.

Examples of suitable substrates are those which are exposed to particularly high levels of rain or sand erosion. Substrates contemplated may be rotor blades, air or land vehicles, boats, built structures or pipelines. Preferred substrates are rotor blades of wind energy systems, helicopters or boat screws, and also air vehicles such as, for example, aircraft. Rotor blades of wind energy systems and aircraft are suitable substrates in particular.

The composition of the invention is applied, in order to minimize cost and/or weight, preferably, in the case of aircraft, in the region of the slats, or, in the case of rotor blades, at the seam of assembled rotor blade components.

The substrates are typically provided with a primer coat, applied by the typical techniques such as spraying (e.g., airless, airmix, compressed-air, hot-spray method or induction mixing), roller coating, rolling or spreading. Filling layers and pore fillers may subsequently be applied, prior to application of at least one composition of the invention and then, if desired, at least one topcoat material.

A further subject of the invention is the use of the multicoat coating systems of the invention to coat substrates. The coating serves here in particular as an erosion-resistant coating. The substrates in question are preferably those specified above.

A further subject of the invention are the substrates identified above and coated with the composition of the invention or with the multicoat coating system of the invention. The composition of the invention preferably forms the erosion-resistant coat of a multicoat coating system.

Test Methods

With the test methods, rain and sand erosion resistance properties of the coatings can be tested.

For the laboratory determination of erosion resistances there are different types of equipment that can be used, where either the material to be eroded is moved through the erosion medium, or the eroding material is fixed and the erosion medium flows around it. A fixed test specimen may be tested, for example, by a high-pressure water jet technique, which is used in water jet cutting, for example. The erosion effect is controlled by water pressure, distance to the workpiece, and nozzle size and type. The effect can be intensified further through the accompanying use of sand, corundum or silicon carbide. Also conceivable is sandblasting or steamblasting, where likewise the applied pressure, nozzle size, and distance to the workpiece can be used to vary the erosion effect and bring about adaptation to real-life conditions.

In the case of the rain erosion test for moving test specimens, the eroding material is fixed on a rotor or disk and, as a result of the radial velocity generated, is moved through a curtain of water droplets or mixtures with salt or sand. Presently the most common test scenario, as used, for example, in the wind energy field, operates with velocities of 140 m/s and a rain volume of 30 l/h. In the field of the aircraft industry, velocities of up to 220 m/s are tested, with a comparable rain volume. The tests on rain erosion resistance may take place in accordance with the standard ASTM G 73. The constructions covered by this standard are individual and can be compared with one another via standard parameters.

In order to assess sand erosion resistance, moving test specimens can be introduced at a predefined angle into a stream of air. For example, the samples are introduced at an angle of 45° into a stream of air (v=30 m/s) admixed with a defined amount of 0.2-0.6 mm grade sand (corresponding to the average airborne sand grade of 0.05-0.8 mm) (mass flow of 400 g/min). The erosion resistance corresponds in turn to the time taken for the substrate to start showing through.

Common to all of the test possibilities referred to above is the simulation of real velocities, such as peripheral velocities of rotor blades or flight velocities of aircraft, for example, and the similarity of the damage patterns to the damage patterns that occur realistically.

The Shore hardness is the determination of the impression hardness of elastomers (A) and duromers (D), (i.e., thermosets). It can be tested in accordance with DIN EN ISO 868. The coatings of the composition of the invention preferably have a Shore hardness of A 50 to A 90. As a result, coatings ranging from flexible to tough and elastic are obtained. A Shore hardness of A 60 to A 80 is preferred.

The invention is elucidated in more detail below, with reference to examples.

EXAMPLES

| | Example 1 Amount | Example 2 Amount | Comparative 1 Amount | Comparative 2 guide formula Bayer RUT 3652/1 Amount |
|---|---|---|---|---|
| Stock component | | | | |
| Polymer based on polyether; polyester | 30.500 | 30.500 | 30.500 | 54.9 |
| Pigment molecular sieve and filler mixture | 51.800 | 51.820 | 51.820 | 43.9 |

-continued

|  | Example 1 Amount | Example 2 Amount | Comparative 1 Amount | Comparative 2 guide formula Bayer RUT 3652/1 Amount |
|---|---|---|---|---|
| Additive mixture | 7.500 | 7.480 | 7.480 | 2.0 |
| Catalyst mixture | 0.200 | 0.200 | 0.200 | 0.02 |
| Isocyanate component |  |  |  |  |
| Diisocyanate-terminated polycaprolactone prepolymer | 80.000 | 80.000 |  |  |
| Hexamethylene diisocyanate oligomers | 20.000 |  |  |  |
| Isophorone diisocyanate oligomers |  | 20.000 |  |  |
| HDI isocyanate trimer |  |  | 100.000 | 100.000 |
| Mixing proportion | 100:100 | 100:100 | 100:60 | 100:75 |

All figures in kg.

Test Conditions
Rain Erosion Test Setup

The tests take place in accordance with the ASTM G 73 standard. They are carried out on an in-house rain erosion test setup. The test specimens are spun at defined time intervals (15 minutes) at defined velocity (140 m/s) through a droplet curtain. The rain volume is likewise kept constant (30 l/h) by the flow rate applied. The droplet sizes of the applied "rain" are on average 5-6 mm. The tests take place at a temperature of 20 to 25° C. Evaluation takes place visually and is documented by a photograph. The erosion resistance corresponds to the time taken for the substrate to first show through.

The coatings were applied with a dry film thickness of approximately 300 μm to an epoxy resin test specimen primed with a pore filler, and were stored at a temperature of 20 to 25° C. for 7 days.

Shore Hardness

The Shore hardness is determined in accordance with DIN EN ISO 868.

|  | Inventive as per Example 1 | Inventive as per Example 2 | Comparative 1 | Comparative 2 |
|---|---|---|---|---|
| Application type | Spraying | Spraying | Spraying | Spraying |
| Duration of rain erosion test | 180 min | 160 min | 45 min | 60 min |
| Shore hardness | A 70 | A 65 | D 65 | D 24 |

In comparison to the compositions used in the prior art, the composition according to the invention, under the conditions specified above, has an erosion resistance which is higher by up to three times.

What is claimed is:

1. A multicoat coating system comprising: at least one coating of a composition comprising:
    a. at least one polyol component comprising at least one polyol selected from the group consisting of polyether polyols, polyester polyols, polyether polyester polyols and mixtures of two or more of the foregoing, said at least one polyol component comprising a hydroxyl group content of 9% to 15% by weight, based on the total weight of the polyol component, and
    b. at least one isocyanate component comprising an isocyanate group content of 10% to 15% by weight, based on the total weight of the isocyanate component, the isocyanate component comprising at least one di- or polyisocyanate-terminated polylactone prepolymer.

2. The multicoat coating system of claim 1, wherein the at least one coating is an outermost topcoat.

3. A substrate coated with the multicoat coating system of claim 1.

4. A method of providing an erosion-resistant coated substrate, comprising applying a composition comprising:
    a. at least one polyol component comprising at least one polyol selected from the group consisting of polyether polyols, polyester polyols, polyether polyester polyols and mixtures of two or more of the foregoing, said at least one polyol component comprising a hydroxyl group content of 9% to 15% by weight, based on the total weight of the polyol component, and
    b. at least one isocyanate component comprising an isocyanate group content of 10% to 15% by weight, based on the total weight of the isocyanate component, the isocyanate component comprising at least one di- or polyisocyanate-terminated polylactone prepolymer
to a substrate, wherein the substrate is a previously coated substrate.

5. The multicoat coating system of claim 1, further comprising at least one primer coat.

* * * * *